(12) United States Patent
Pierce

(10) Patent No.: US 7,000,302 B2
(45) Date of Patent: Feb. 21, 2006

(54) PROCESS FOR PREPARING A RADIO FREQUENCY CABLE FOR COUPLING

(76) Inventor: Skip A Pierce, 2424 W. Tampa Bay Blvd., Apt. F103, Tampa, FL (US) 33607

( * ) Notice: Subject to any disclaimer, the term of this patent is extended or adjusted under 35 U.S.C. 154(b) by 516 days.

(21) Appl. No.: 10/246,892

(22) Filed: Sep. 19, 2002

(65) Prior Publication Data

US 2004/0055154 A1    Mar. 25, 2004

(51) Int. Cl.
*B25B 27/14*    (2006.01)

(52) U.S. Cl. .............................. 29/280; 29/857; 29/867; 29/825; 29/828; 29/750; 29/758; 29/764; 83/425; 83/861; 83/870

(58) Field of Classification Search ................. 29/280, 29/750, 758, 764, 33 F, 825, 828, 867; 83/861, 83/444, 870, 426, 407, 425, 9.51, 105, 102
See application file for complete search history.

(56) References Cited

U.S. PATENT DOCUMENTS

| | | | | |
|---|---|---|---|---|
| 2,391,721 A | * | 12/1945 | Lundeen | ........................ 83/102 |
| 2,711,109 A | * | 6/1955 | Gillstrom | ....................... 225/93 |
| 3,175,430 A | * | 3/1965 | Smith et al. | ................... 81/9.51 |
| 3,316,781 A | * | 5/1967 | Bignell et al. | ................ 81/9.51 |
| 3,641,852 A | * | 2/1972 | Terada | ........................... 83/861 |
| 3,817,132 A | * | 6/1974 | Emery et al. | .................. 83/105 |
| 4,015,497 A | * | 4/1977 | Burgess | ....................... 83/425.2 |
| 4,345,362 A | * | 8/1982 | de Givry | ..................... 29/426.5 |
| 4,534,254 A | * | 8/1985 | Budzich et al. | ............. 83/425.2 |
| 4,584,912 A | * | 4/1986 | Gudmestad et al. | .......... 81/9.51 |
| 4,614,135 A | * | 9/1986 | Ito et al. | ....................... 81/9.51 |
| 4,699,027 A | * | 10/1987 | Guyette et al. | ............... 81/9.51 |
| 5,107,735 A | * | 4/1992 | Ramun et al. | ................. 83/407 |
| 5,211,093 A | * | 5/1993 | Horniak | ........................ 83/426 |
| 5,542,327 A | * | 8/1996 | Schultz | ......................... 83/861 |
| 5,806,188 A | * | 9/1998 | Caraballo | ..................... 30/92.5 |
| 6,311,600 B1 | * | 11/2001 | Lo et al. | ........................ 83/861 |
| 6,694,853 B1 | * | 2/2004 | Adams | ......................... 83/870 |
| 6,739,229 B1 | * | 5/2004 | Scollon | ......................... 83/444 |

* cited by examiner

*Primary Examiner*—Richard Chang
(74) *Attorney, Agent, or Firm*—Donald R. Bahr

(57) ABSTRACT

Radio frequency cables have a inner circular conductor and an outer circular conductor. The inner and outer circular conductors are usually formed from copper and are separated by a heavy insulation layer usually cellular polyethylene. The outer side of the outer conductor may further be coated with a heavy polymeric insulation layer. In preparing these radio frequency cables for coupling it is necessary to have a flush cut surface. These flush cuts have been effected in the past by sawing, which has proved to be troublesome as metallic particles are dispersed throughout the insulation. The outer conductor may be prepared for coupling by:
1. Placing a tear collar over the outer conductor and
2. Tearing the outer conductor against the tear collar.
This tearing creates an integral and desirable flange in the tearing process.

19 Claims, 4 Drawing Sheets

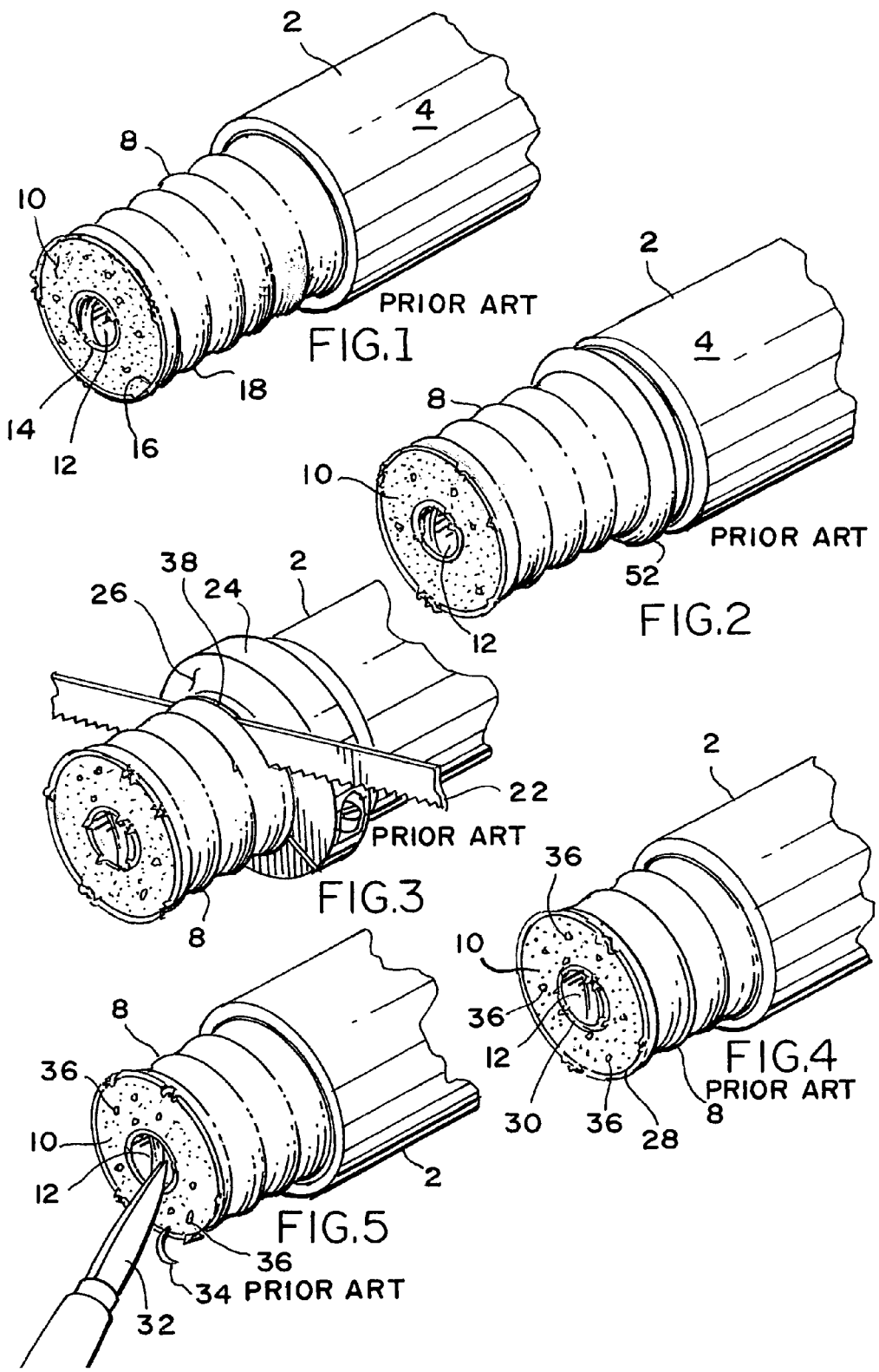

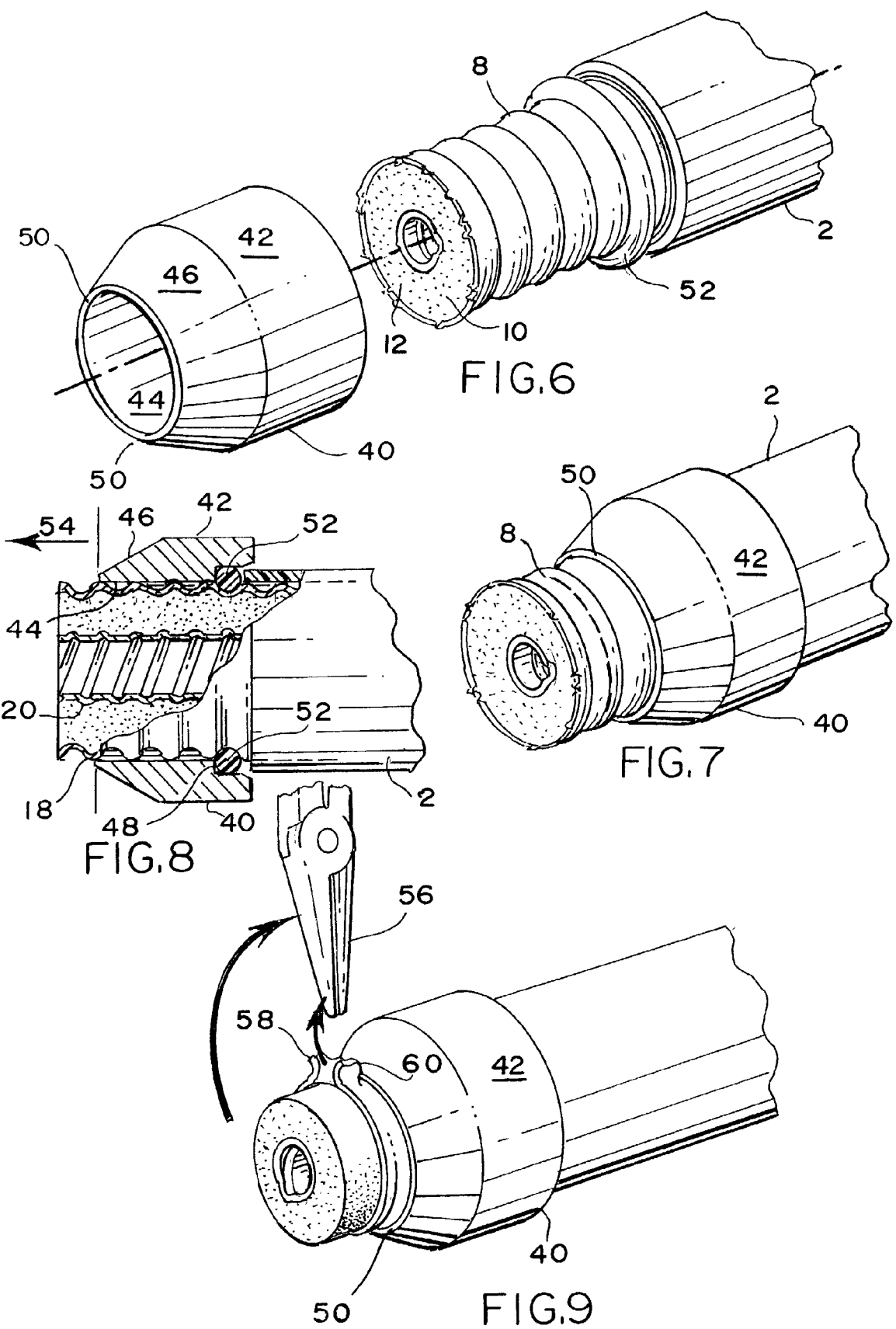

PROCESS FOR PREPARING A RADIO FREQUENCY CABLE FOR COUPLING

FIELD OF THE INVENTION

This invention is concerned with radio frequency cables (herein after R.F. cables). More particularly this invention is concerned with the preparation of the outer conductor of an R.F. cable for coupling. In accordance with this invention the outer conductor component of an R.F. cable is torn at a predetermined point. In the tearing an integral flange is formed. Upon tearing and after the trimming of the insulation and inner conductor, the R.F. cable is ready for coupling.

BACKGROUND OF THE INVENTION

Cellular telephones have become very popular in recent years. With the advent of this popularity a tremendous need has developed for towers to relay the phone calls which result from these cellular telephones. In operation a cellular phone transmits radio waves which are received by a nearby cellular telephone tower, (herein after cell tower). The function of the cell towers is to pick up the radio frequency signals which are transmitted by the cell phone and convert these radio frequency signals into electrical signals which can be transmitted over land lines to a central switching station. The antennas for the radio signals transmitted by the cell phones are usually located high up on cell towers. In operation the cell tower receives a radio frequency signal high up on the tower and transfers this signal down the tower to a converter which is located at ground level. The radio frequency signal is sent down the tower in an R.F. cable. This invention is concerned with making connections between two sections of an R. F. cable. In the process of making a connection between two sections of an R.F. cable, it is necessary to make flush cuts on both segments of the R.F. cables which are being joined. This invention relates to a process and apparatus whereby the flush cuts can be made. As will be explained in detail herein below, R.F. cables are complex structures. Joined R. F. cables will not function correctly if they are not perfectly cut or if contaminants are present in the insulation layer of the R.F. cable. In accordance with this invention virtually perfect flush cuts can be made on R.F. cable without introducing contaminants into the insulation component of the cable. After opposing flush cuts are made on opposing sections of an R.F. cable these opposing sections can be readily joined with an appropriate connector.

BRIEF DESCRIPTION OF THE DRAWINGS

FIG. 1 is a perspective view of an R.F. cable.

FIG. 2 is a perspective view showing the placement of an O Ring on an R.F. cable.

FIG. 3 is a perspective view showing a prior art method for cutting an R.F. cable.

FIG. 4 is a perspective view showing a finished prior art cut on an R.F. cable.

FIG. 5 is a perspective view showing the chamfering of the inner conductor of an R.F. cable.

FIG. 6 is a perspective view showing the placement of a tear collar on a section of an R.F. cable.

FIG. 7 is a perspective view showing the tear collar seated on a section of an R.F. cable.

FIG. 8 is a cut away side view along line 7—7 showing the seating of a tear collar on an O ring.

FIG. 9 is a perspective view showing the formation of a tearing tab on the outer conductor of an R.F. cable.

OBJECTS OF THE INVENTION

Figure 10:
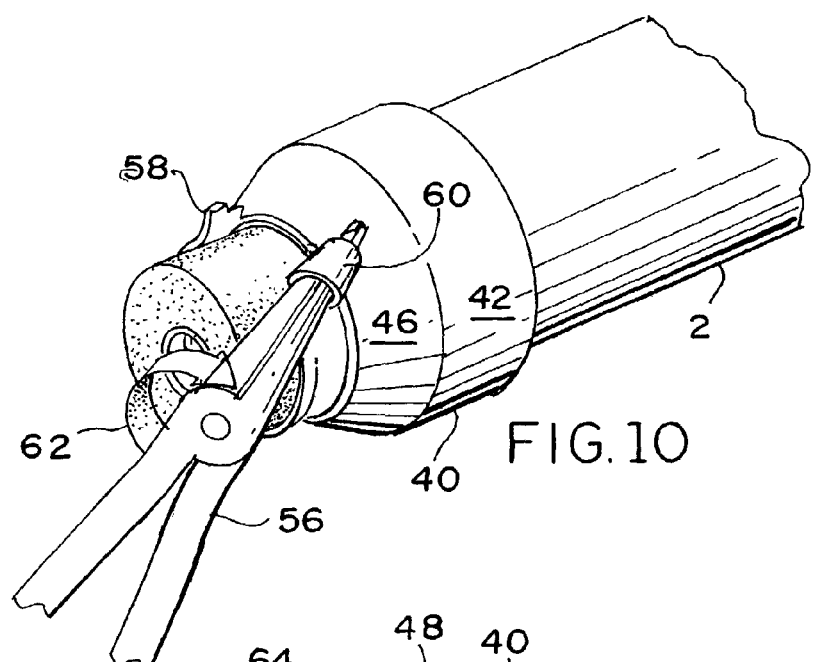
FIG. 10 is a perspective view showing the tearing of the outer conductor of an R.F. cable.

The primary object of the invention is a process whereby the outer conductor of an R.F. cable can be torn to facilitate the formulation of a flush cut.

Another object of the invention is a tear collar which allows the precise tearing of the outer conductor of an R.F. cable.

Still another object of this invention is a process for flush cutting an R.F. cable without introducing contaminants into the insulation layer of the R.F. cable.

Still another object of this invention is a process for making flush cuts on R. F. cables without tearing the insulation layer.

BRIEF SUMMARY OF THE INVENTION

This invention is concerned with a process for making flush cuts on R.F. cables. More particularly this invention is concerned with a process for tearing the outer conductor of an R.F. cable at a predetermined point.

The process of this invention is effected by placing a tear collar over the outer conductor of an R.F. cable. A segment of the outer conductor is then twisted in such a manner that a precise tear is made against the tear collar. After the outer conductor is torn the inner conductor and the insulating layer are removed by other means. The process of this invention eliminates the introduction of contaminants into the insulation layer of the R.F. cable.

DESCRIPTION OF THE PREFERRED EMBODIMENT

As is briefly discussed above this invention is concerned with a process for making flush cuts on R.F. cable segments in order that opposing sections of cable might be joined together with a suitable connector.

In order to understand this invention the component parts of an R.F. cable and their function must be understood. In this regard referring to FIG. 1 it can be seen that R. F. cable 2 is an axial structure. This structure is used to conduct radio frequency signals along the length of a cable. Signals in the frequency range of from about 800 MGz to about 2.2 GHz are usually conducted in an R.F. cable. Referring to FIG. 1, it can be seen that R.F. cable 2 incorporates a heavy insulating layer 4 on its outer side. Insulating layer 4 is usually formed from a polymeric material. Insulating layer 4 does not play a significant part in the subject invention as it is usually removed for the portion of the R.F. cable on which a flush cut is to be made. R.F. cable 2 further incorporates an outer conductor 8 an insulating layer 10 and an inner conductor 12. Radio energy is transmitted along the axial length of R.F. cable 2 by radio wave length energy being reflected off of outer surface 14 of inner conductor 12 to inner surface 16 of outer conductor 8 through insulation layer 10.

Insulation layer 10 functions to separate inner conductor 12 from outer connector 8. Insulation layer 10 is formed from a polymeric, dielectric material such as polyethylene. In order to minimize weight in most instances insulation layer 10 is formed from a cellular polymeric material such as cellular polyethylene. Cut or ruptured cells in insulation layer 10 present a problems, in R.F. cables. These cut or ruptured cells are troublesome as they tend to trap impurities which may result in the cutting of R.F. cable 2, i.e. metal particles which may result from the cutting of inner and outer conductors 8 and 12.

Inner and outer conductors 12 and 8 are formed from a conductive material preferably a metal and preferably copper. Copper is preferred due to its outstanding conductive properties.

In installing R.F. cable 2 it is often necessary to bend certain cable sections. As can be seen from FIG. 1, inner and outer conductors 12 and 8 are tubular in structure. If a tube is bent it tends to kink and deform. In order to prevent the kinking and deformation of R.F. cable 2 in bending, inner and outer conductors 12 and 8 are corrugated. It is well known to one skilled in the art that a corrugated tubular structure can be bent, to a limited degree, without kinking or deformation. In the R.F. cable structure illustrated in FIG. 1, outer conductor 8 incorporates a plurality of non spiral corrugations 18. Inner conductor 12 incorporates a continuous spiral corrugation 20 as is shown in FIG. 8. Corrugations 18 of outer conductor 8 present special problems in the cutting of this segment of R.F. cable 2.

In the prior act in order to make a flush cut outer conductor 8, inner conductor 12 and insulation layer 10 were cut with a saw, usually a hack saw. This cutting is illustrated in FIG. 3 wherein it can be seen that saw blade 22 is cutting through the components of R.F. cable 2. A guide 24 has been positioned around outer conductor 8 at a predetermined position. Saw blade 22 is biased against vertical surface 26 of guide 24 for purposes of guiding saw blade 22 to make an approximate vertical cut. Saw blade 22 in cutting outer conductor 8 forms rough edges 28 and 30 on outer conductor 8 and inner conductor 12. These rough edges are illustrated in FIG. 4. In order to smooth rough edges 28 and 30, these edges are chamfered with a knife blade 32 as is shown in FIG. 5. This chamfering after creates further problems as the chips which are formed work their way into the interfaces between insulation layer 10 and inner and outer conductors 12 and 8.

In the cutting as is illustrated in FIG. 3, metallic particles 36 are created. These metallic particles are metallic saw dust. The reciprocal action of saw blade 22 draws these particles into the saw cut 38. The continued reciprocal action of saw blade 22 causes metallic particles 36 to be embedded into insulation layer 10. Because insulation layer 10 is cellular, this embedding process is very effective.

Having metallic particles 36 embedded into insulation layer 10 is undesirable, as these metallic particles interfere which the transmission of radio waves through R. F. cable 2.

As a result of this interference, it is necessary to remove all metal particles from the cut face of insulation layer 10 and from the interface between insulation layer 10 and inner and outer conductors 12 and 8. This removal of these metal particles becomes difficult if not impossible due to the fact that these particles are embedded into cellular insulation layer 10. This difficulty is further magnified by the fact that the cutting and connecting of R.F. label 2 is often done under adverse cramped conditions. i.e. high up on a cell tower or in a small box at the bottom of a cell tower.

Another problem with the cutting of R.F. cable 2 as is shown in FIG. 3 is that the teeth of saw blade 22 tend to snag insulation layer 10 with this snagging insulation layer 10 is torn as saw blade 22 is drawn back and forth. This tearing action creates voids in insulation layer 10. These voids become air pockets which further interfere with the transmission of radio frequency energy through R.F. cable 2.

The above set forth problems are eliminated by the process and apparatus of this invention wherein a clean cut can be made on an R.F. cable without the formation of voids in the insulation layer or the contamination of the insulation lager with metallic particles.

The process of this invention relates to the use of a tear collar to control the point at which the outer conductor is torn. Referring to FIG. 6 it can be seen that tear collar 40 has a circular cross section and is generally tubular. Tear collar 40 has a main body section 42, a bore 44, an angular tool rest 46, a stop 48 and a tearing edge 50.

In usage a rest is provided whereby tear collar 40 can be seated on cable 2. In the preferred embodiment of this invention tear collar 40 is seated on the O ring which is later used to seal a connector to cable 2.

In usage an O ring 52 is seated in a valley of a pre-selected corrugation on outer conductor 8. Tear collar 40 is then placed over outer conductor 8, such that outer conductor 8 penetrates bore 44 of tear collar 40. Tear collar 40 is then firmly seated on O ring 52, such that O ring 52 is biased against stop 48. When tear collar 40 is seated against O ring 52, tear collar 40 is located at a predetermined point on outer conductor 8.

O ring 52 is formed from an elastic polymeric material to aid in the sealing of the connector which is used to join the R.F. cable sections.

The applicant does not understand the full ramifications of how the elastic nature of O ring 52 affects the tearing of outer conductor 8. It has been observed that the ability of tear collar 40 to flex against O ring 52 has beneficial effects on the tearing process.

In the preferred embodiment of this invention tear collar 40 is biased against an elastic stop i.e. an elastic O ring. The elastic stop can have a durometer of from about 50 to about 75, with a more preferred range being from about 55 to about 65, with a most preferred durometer for the elastic stop being 60.

The length of tear collar 40 is such that when stop 48 is biased against O ring 52, tearing edge 50 is positioned at a predetermined point on outer conductor 8.

As is illustrated in FIG. 8 it is preferred that tearing edge 50 be located approximate the apex of one of the corrugation of outer connector 8. In the most preferred embodiment tearing edge 50 is located just forward of the apex of a corrugation in the direction of arrow 54. This location facilitates the formation of a desirable flange on outer conductor 8, when tearing is effected.

FIGS. 9 and 10 illustrate the actual tearing process, as can be seen in FIG. 9 a tool 56 is used to grab a segment of outer conductor 8. In the illustrated process tool 56 is a needle nose pliers. The pliers is opened slightly and one jaw of the pliers is inserted into insulation layer 10. Tool 56 is then closed and rotated causing the formation of tabs 58 and 60 on outer connector 8. Tool 56 is then used to grip one of tabs 58 or 60, the gripping of tab 60 being illustrated. Once this gripping is effected tool 56 is biased against tool rest 46 and rotated in the direction of arrow 62. Prior to rotation the axis of tool 45 is angularly disposed to the axis of tearing collar 40 at a compound angle. One segment of this compound angle is controlled by the angle of tool rest 46 in relation to the axis of tearing collar 40. The angle of tool rest 46 in relation to the axis of tearing collar 40 can be from about 15 to about 45 degrees with a more preferred range being from about 25 to about 35 degree with a most preferred angle being 30 degrees.

The rotation of tool 56 is continued until the tearing of outer conductor 8 is effected over 360°. Tearing is effected by the biasing of outer conductor 8 against tearing edge 50.

Figure 11:
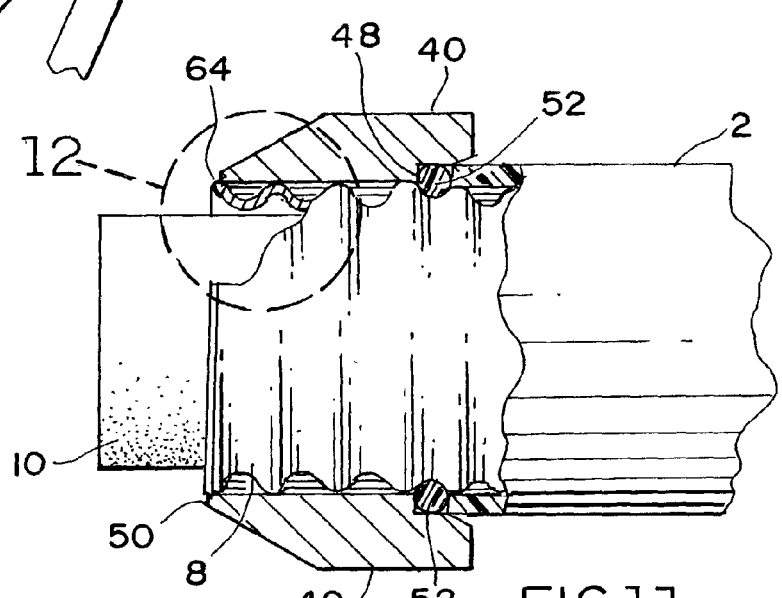
FIG. 11 is a perspective view showing the outer conductor of an R.F. cable torn.
Figure 12:
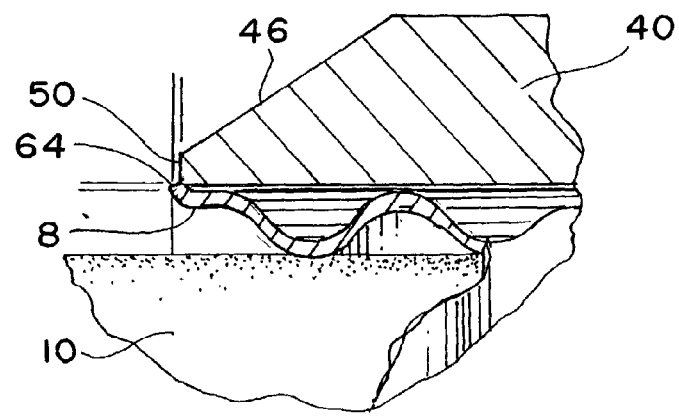
FIG. 12 is an expanded section view along line 11—11 of FIG. 12 of an R.F. cable after the outer conductor has been torn.

FIGS. 11 and 12 illustrate the composite structure with tearing collar 40 attached after the tearing of outer conductor 8 is completed. As can be seen the tearing of outer conductor 8 against tearing edge 50 is effected with great precision. When the tearing is completed a section of insulation 10 protrudes from the structure with inner conductor 12 therein. These segments are then subsequently cut flush with outer conductor 8.

In the tearing of outer conductor 8 a flange 64 is formed, this flange is very useful in connecting a connector to outer conductor 8. The size of flange 64 must be minimal in order less it prevent the removal of tearing collar 40 off of the trimmed R.F. cable.

The size of flange 64 is affected by the clearance of outer conductor 8 in bore 44. The clearance of outer conductor 8 in bore 44 can be from about 0.002 to about 0.030 inches, with a more preferred range being from about 0.005 to about 0.020 inches with a most preferred range being 0.008 to 0.015 inches with a clearance being 0.010 inches.

After outer conductor 8 is torn from cable 2 in accordance with the process and apparatus described above a post 66 of insulation layer 10 with inner conductor 12 therein remains protruding from cable 2. This post can be trimmed by any convenient means such as trimming insulation layer 10 with a knife and then cutting inner conductor 12 with a specialized tubing cutter.

Figure 13:
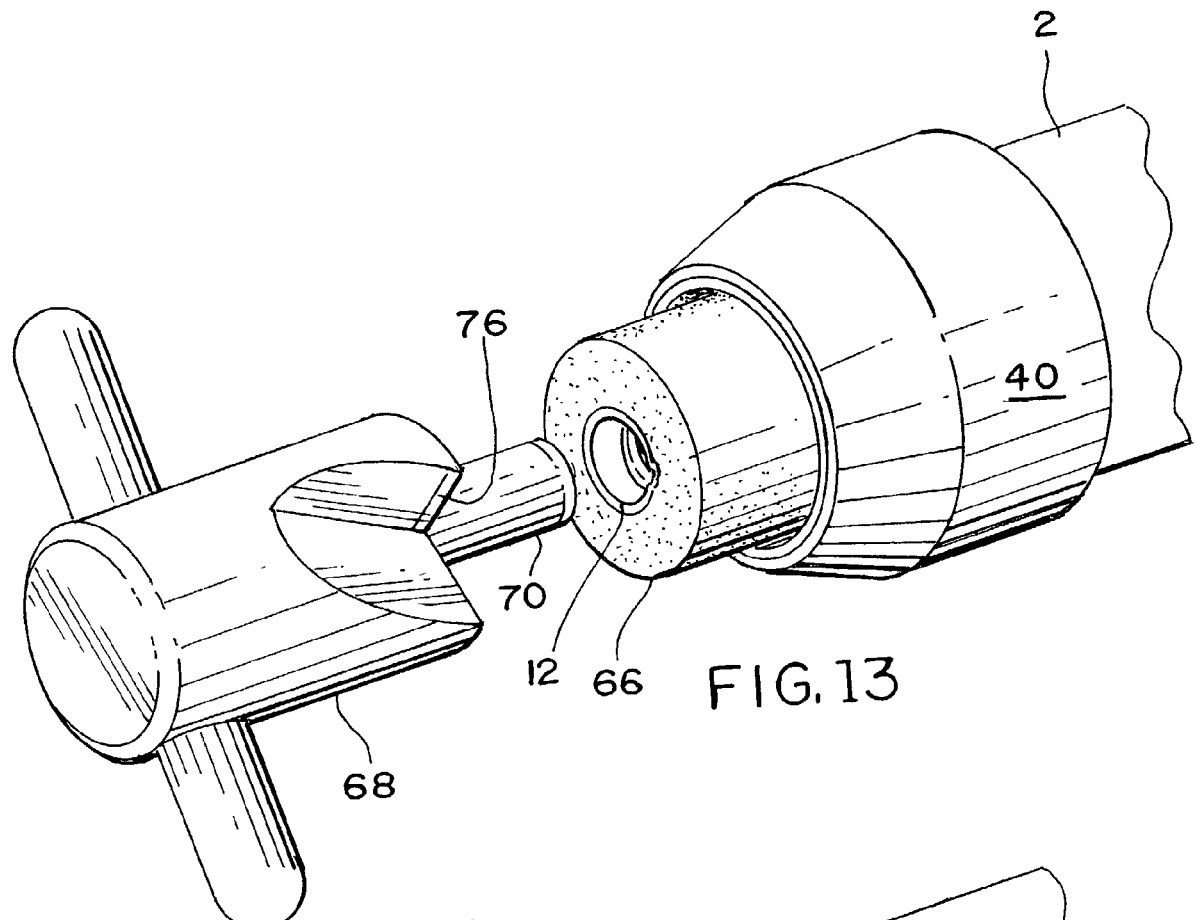
FIG. 13 is a perspective view showing the placement of a cutter in an R.F. cable after the outer conductor has been torn away.
Figure 14:
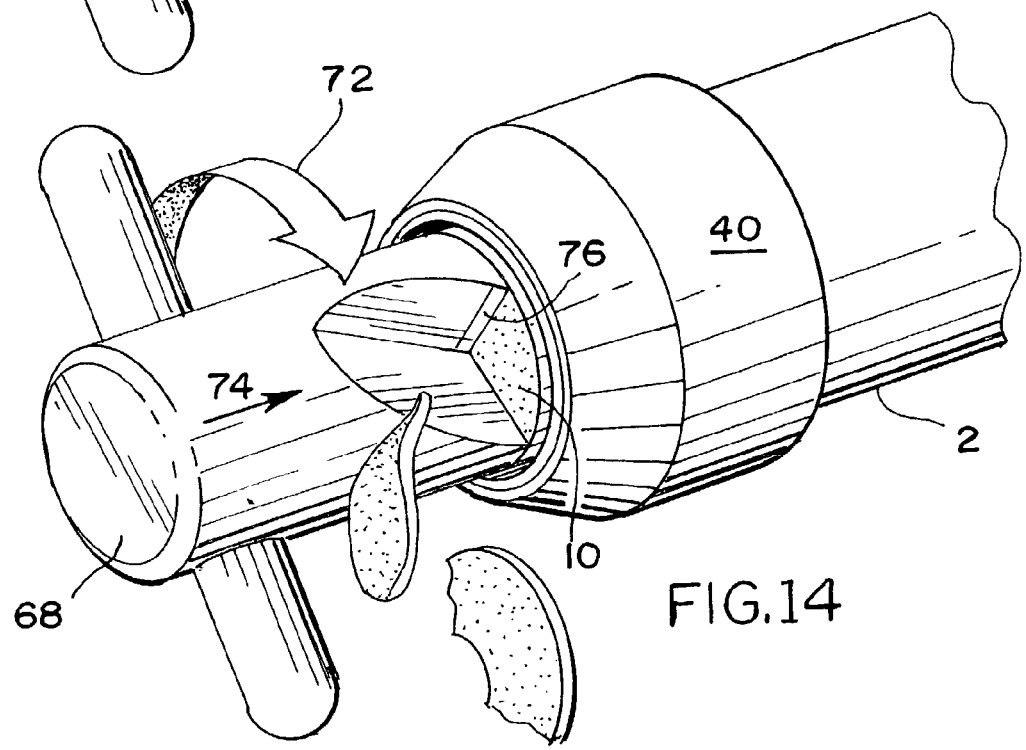
FIG. 14 is a perspective view showing the cutting of the insulation and the inner conductor segments of an R.F. cable.

FIGS. 13 and 14 show a method for trimming post 66 with hand operated trimmer 68. To trim post 66 mandrel 70 of trimmer 68 is inserted into inner conductor 12. Trimmer 68 is then rotated in the direction of arrow 72 while pressure is applied in the direction of arrow 74. This procedure causes blades 76 of cutter 68 to bite into post 66 thereby trimming both insulation layer 10 and inner conductor 12.

This trimming of post 66 can be effected with tear collar in place. With tear collar 40 in place the composite structure can be gripped, during the trimming of post 66, without danger of deforming outer conductor 8.

Once the trimming of post 66 is completed tear collar 40 is removed and the coupling of opposing sections of flush cut R.F. cable sections is completed using a suitable connector. Various embodiments of connectors can be used, these connectors are not part of this invention.

As to these connectors it should be noted that this invention is highly advantageous as the O ring 52 which is used to seal the connector is used as a stop for tear collar 40, thereby allowing precise placement for the tearing of outer conductor 8 at tearing edge 50.

While O ring 52 is shown as a stop for tear collar 40 it is understood by one skilled in the art that other stops can be utilized. These alternate stops can be part of a connector system or they can be attached solely as a stop for tear collar 40.

The above description and drawings are illustrative only since modifications can be made without departing from the present invention, the scope of which is to be limited only by the following claims.

What is claimed is:

1. A process for trimming the outer conductor of a corrugated metal cable which comprises the steps of:
   a. placing a stop on the outside of the outer conductor, wherein the stop is orientated with the corrugations of the outer conductor,
   b. placing a tear collar having an integral tearing edge over the outer conductor, the tear collar being biased against the stop, leaving a position of the outer conductor protruding from the tear collar,
   c. forming a tab on the exposed portion of the outer conductor,
   d. gripping the tab with a tool which can be positioned over the biased against the tear collar,
   e. orienting the tool at an angle to the axis of the cable,
   f. rotating the tool with force sufficient to cause the outer conductor to tear along the tearing edge,
   g. continuing the tool rotation until the tearing is effected over the periphery of the cable.

2. The process of claim 1 wherein the stop is orientated in a valley of the corrugated outer conductor.

3. The process of claim 1 wherein the stop orientated on a ridge of the corrugated outer conductor.

4. The process of claim 1 wherein the stop is an O ring which is located in a valley of the corrugated outer conductor.

5. The process of claim 1 wherein the bore size of the tearing collar approximate the tearing edge is slightly larger than the diameter of the outer conductor.

6. The process of claim 2 wherein the bore size of the tearing collar approximate the tearing edge is slightly larger then the diameter of the outer conductor.

7. The process of claim 3 wherein the bore size of the tearing collar approximate the tearing edge is slightly larger than the diameter of the outer conductor.

8. The process of claim 4 wherein the bore size of the tearing collar, approximate the tearing edge is slightly larger than the diameter of the outer conductor.

9. The process of claim 5 wherein the bore size of the tearing collar, approximate the tearing edge of about 0.010 inches larger than the diameter of the outer conductor at an apex of a corrugation.

10. The process of claim 6 wherein the bore size of the tearing collar, approximate the tearing edge is about 0.010 inches larger than the diameter of the outer conductor at an apex of corrugation.

11. The process of claim 7 wherein the bore size of the tearing collar, approximate the tearing edge is about 0.010 inches larger than the diameter of the outer conductor at an apex of a corrugation.

12. The process of claim 8 wherein the bore size of the tearing collar, approximate the tearing edge is about 0.010 inches larger than the diameter of the outer conductor at an apex of a corrugation.

13. The process of claim 9 wherein the tearing of the outer conductor is effected slightly forward of the apex of a ridge of a corrugation.

14. The process of claim 10 wherein the tearing of the outer conductor is effected slightly forward of the apex of a ridge of a corrugation.

15. The process of claim 11 wherein the tearing of the outer conductor is effected slightly forward of the apex of a ridge of a corrugation.

16. The process of claim 12 wherein the tearing of the outer conductor is effected slightly forward of the apex of a ridge of a corrugation.

17. The process of claim 1 wherein the stop is formed from an elastic material.

18. The process of claim 4 wherein the stop is formed from an elastic material.

19. The process of claim 18 wherein the stop has a durometer of about 60.

* * * * *